(12) United States Patent
Vogel et al.

(10) Patent No.: US 6,931,027 B1
(45) Date of Patent: Aug. 16, 2005

(54) FRAMED PACKET BUS WITH IMPROVED FPB PROTOCOL

(75) Inventors: Danny Vogel, Sudbury, MA (US); Bryan Robb, Cambridge, MA (US); Clinton Seeman, Blackstone, MA (US)

(73) Assignee: LSI Logic Corporation, Milpitas, CA (US)

( * ) Notice: Subject to any disclaimer, the term of this patent is extended or adjusted under 35 U.S.C. 154(b) by 800 days.

(21) Appl. No.: 09/624,816

(22) Filed: Jul. 25, 2000

(51) Int. Cl.[7] .............................................. H04J 3/18
(52) U.S. Cl. ........................ 370/477; 370/442; 370/437
(58) Field of Search ................................. 370/352, 401, 370/437, 442, 477, 510, 511, 514, 79, 82, 370/99; 455/3.01; 704/277; 709/201, 203, 709/223, 224, 228, 233, 315; 725/105; 710/104; 714/48, 4; 375/224; 379/11

(56) References Cited

U.S. PATENT DOCUMENTS

| | | | |
|---|---|---|---|
| 5,243,699 A | * | 9/1993 | Nickolls et al. ............... 712/11 |
| 5,428,611 A | * | 6/1995 | Jain et al. .................... 370/470 |
| 5,822,328 A | * | 10/1998 | Derby et al. ................. 370/507 |
| 6,609,167 B1 | * | 8/2003 | Bastiani et al. .............. 710/104 |
| 6,629,288 B1 | * | 9/2003 | Bernath et al. .............. 714/807 |

* cited by examiner

Primary Examiner—Wellington Chin
Assistant Examiner—John Shew
(74) Attorney, Agent, or Firm—Sawyer Law Group LLP

(57) ABSTRACT

In a Framed Packet Bus (FPB) serial bus, an improved protocol and circuit layout for communication between devices grounded in the same chassis or chip. The improved protocol eliminates the requirement that bits have DC balance in their HIGH and LOW voltage levels. Consequently, bus overhead is reduced over prior techniques. In one example, data capacity utilization was increased from 80% to 95% and bus overhead was reduced from 20% to 5%. As a result of increased capacity, more packets of data may be carried across the serial bus, and any leftover bits within the frame cycle and in subsequent cycles may carry error detection information or be utilized as a control for the bus. In one preferred embodiment, the FPB serial bus configuration consists of sixteen serial lines arranged in parallel.

46 Claims, 5 Drawing Sheets

FRAMED PACKET BUS WITH IMPROVED FPB PROTOCOL

BACKGROUND OF THE INVENTION

1. Field of Invention

The present invention relates generally to serial bus protocols and bus designs utilizing these protocols.

2. Description of Related Art

When separate devices or entities communicate, packets (the terms packet and frame are often used synonymously, but in this invention packets will generally refer to data payload while frames are used in the context of the invention) of data bits are transmitted in a series of blocks or units (frames), using a particular rule format, or protocol, such as when the entities are peers on the same layer, consisting of information bits that are parsed into components. The informational bits of the frame comprise both digital data that is sought to be transmitted (often simply called the "data") as well as bits that are considered overhead required by the protocol (control field data bits). The latter overhead bits are sometimes called the header or trailer of the frame. The overhead bits not part of the informational bit data are sometimes called the "overhead tax" of the packet.

Over a traditional network (such as a Wide Area Network), various protocols or data communication standards exist for sending digital data, both synchronously, such as in synchronous time division multiplexing (TDM) networks, and asynchronously, such as in packet store-and-forward networks. These protocols are vital for increased throughput, efficiency, reduced error rate, scalability, traffic engineering, service differentiation, uniformity and other parameters measuring Quality of Service (QoS). These protocols can exist at any level of the traditional OSI model for networks, but typically are found in the data link layer (layer 2) or network layer (level 3). Protocols are implemented in hardware (e.g. an ASIC), software, or both, and typically involve sending packets (blocks of data transmitted as a single entity). The development of protocols has been the result of collective effort, often ratified by standards bodies like the ISO, ITU and ANSI, with QoS considerations at the forefront. Some protocols include, generally, (with numerous versions of each): ADCCP, AppleTalk, ATM, BGP, EGP, Ethernet, FDDI, frame relay, HDLC, IP, IGRP, IPX, ISDN, LLC, MPLS, MPOA, NetBIOS, OSPF, PPP, SDLC, SMDS, SONET, RIP, TCP/IP, Token Ring, VLAN, 802.1 and X.25.

Over a serial bus, such as communication between serdes (serializer/deserializer circuits), another type of protocol is to use a serial bus protocol that employs a eight-bit-to-ten-bit (8B/10B) encoder. This protocol is employed in order to guarantee that the resulting transmitted code has a minimum frequency of bit transitions (HIGH to LOW or vice versa), needed for clock recovery in serial bus implementations, as well as to provide DC balance. One of the aspects of the present invention is to realize that this conventional serial bus protocol is too restrictive and imposes too high of an overhead tax in certain situations where so-called DC balance is not important. Consequently, a new protocol and implementation of a serial/parallel bus employing this protocol is disclosed by the present invention.

SUMMARY OF THE INVENTION

An aspect of the present invention is to provide dramatically higher data bandwidth than provided by current conventional practices across a serial or parallel bus carrying packets of digital data between semiconductor chips, between printed circuit cards in a chassis, or more generally between any two devices that desire to communicate, preferably in a synchronous manner.

A further object of the invention is for an improved protocol for synchronous data transfer.

Another object of the invention is to lower the use of bandwidth for overhead purposes as compared to known prior protocols, that is, to disclose a lower overhead tax.

Yet another object of the invention is for an improved serial Framed Packet Bus (FPB) protocol that provides more bits per frame for control purposes, such as error control, and for the backplane of a switching system.

Still another object of the invention is to provide a superior configuration of parallel data transfer using the serial FPB disclosed herein.

The above described features and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION OF THE PREFERRED EMBODIMENTS

Disclosed herein is a detailed description of the best presently known mode of carrying out the invention. This description is not to be taken in a limiting sense, but is made merely for the purpose of illustrating the general principles of the invention. The section titles and overall organization of the present detailed description are not intended to limit the present invention.

Figure 1:
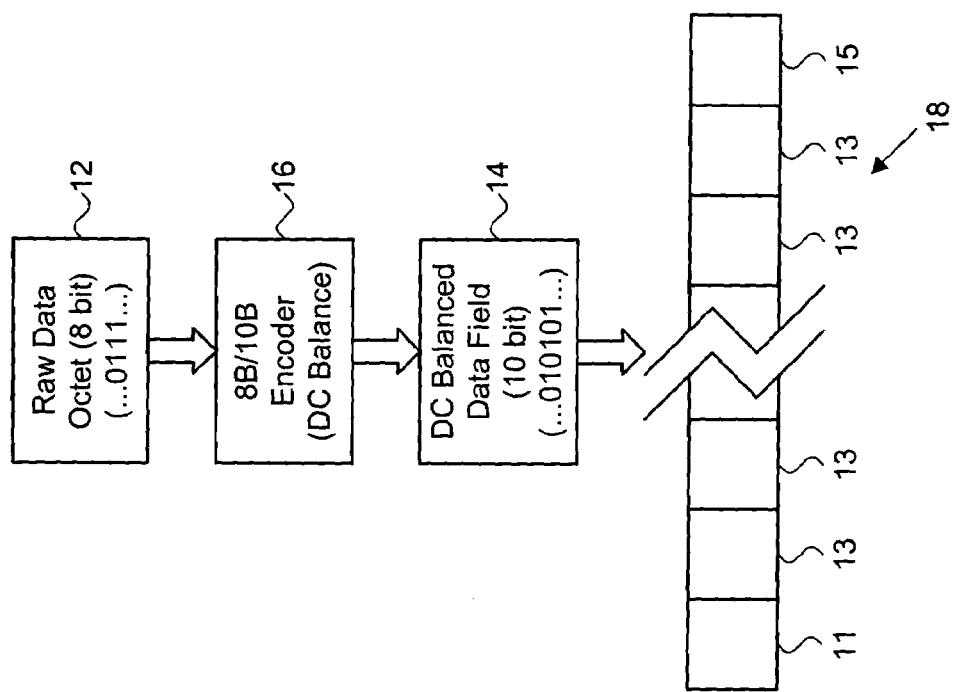
FIG. 1 (PRIOR ART) is a conceptual block diagram of a prior art design of an 8B/10B encoder used in a serial bus, and the frame format associated with such a encoder.

FIG. 1 shows a conventional prior art serial bus communication, frequently a point to point bus carrying data that provides its own addressing, of which the present invention seeks to improve upon. Two devices or entities, such as serdes (not shown), wish to communicate packets of data 12 containing informational bits. To ensure proper bit transition densities, the data 12 are formed into a DC balanced data field 14 though an eight-bit-to-ten-bit (8B/10B) encoder 16. The data field is then made into a packet 18 that itself contains bits or codes that delimit a block of related bits. The packet 18 may also contain error correction or detection information, such as CRC (polynomial code, i.e., checksum). The 8B/10B encoder may perform the steps of encoding for DC balance and adding of additional symbols simultaneously in normal use. To reduce pin counts, typically the delimiting code information is carried "in-band", meaning within the same path carrying the data bits. Additionally, the packet bus is typically implemented as a high speed serial bus, or as a set of high speed serial buses forming a parallel bus configuration. A high speed serial bus typically recovers clock information from the data lines, thus a minimum frequency of bit transitions within the data stream is required in order to maintain clock synchronization between the transmitter and the receiver. Sometimes, as in SONET systems (not shown), data is further scrambled to randomize the data in the hopes of generating more bit transitions in the encoded data stream, though data streams can be constructed that will cause this technique to fail. In addition, SONET systems do not guarantee any minimum transition density. Furthermore, SONET-type scramblers may complicate the implementation of serial packet buses.

In the conventional serial circuit shown in FIG. 1, a typical serial bus implementation will use an eight-bit-to-ten-bit (8B/10B) encoder 16 to transform the raw data that is to be carried across the serial bus. The 8B/10B encoder takes an eight bit piece of data represented in 1's and 0's, such as raw data field octet 12, and converts it to a ten bit code, such as ten bit DC balanced data field 14. The additional bits allow the 8B/10B encoder to guarantee that the resulting code has a minimum frequency of bit transitions needed for clock recovery in serial bus implementations. Using an 8B/10B encoding scheme guarantees, by nature of the algorithm, that the data, such as data block 14, is DC balanced.

The 8B/10B encoder 16 provides DC balancing. This means that an approximately equal number of 0 bits and 1 bits come out of the encoder over time. This results in output voltages that are balanced between the two voltages (e.g., LOW and HIGH square wave pulses in the time domain) used to encode 0's and 1's, permitting A/C coupling to the bus, so that the average voltage of the bits is not biased either LOW or HIGH. Further details of DC balance as given by 8B/10B encoding are found in the article "A DC-Balanced, Partitioned-Block, 8B/10B Transmission Code", by A. X. Widmer and P. A. Franaszek, IBM Journal of Research, Vol. 27, No. 5, September 1983, incorporated by reference herein.

The 8B/10B encoder 16 in FIG. 1 can insert extra codes that can be used for many purposes, including delimiting the start and end of a packet of data. Thus a packet of data, referenced as packet 18, formed from 64 octets (512 bits; with an octet=1 byte=8 bit storage unit, 64×8=512 bits of raw data), may consist of a 10 bit delimiter, shown as block 11, sixty-four (64) 10 bit data codes, shown as blocks 13, and a trailing 10 bit delimiter, shown as block 15, for a total of 660 bits after encoding. This means that the actual data utilization of a bus carrying 8B/10B encoded codes is less than 80%, and in this example the bus data utilization rate is 512/660=77.6%. Conversely, the difference between 100% and the rate of actual data utilization of the bus can be termed a packet or frame "tax" or "bus overhead". In the above example the packet tax (bus overhead) would equal 100%−77.6%=22.4%.

Turning now to FIGS. 2, 3, 4 and 5, there are shown embodiments of the present invention. In the present invention the Framed Packet Bus (FPB) improves the bus data utilization rate between two devices that desire to communicate and transport data to and from one another, such as semiconductor chips in close proximity sharing the same ground, or between components in a printed circuit card in a chassis. This is done by, among other things, relaxing the requirement for DC balance. Thus one characteristic of the protocol employed by the devices utilizing the FPB of the present invention is the absence of a guarantee of DC balance in the digital bits transmitted and received by the devices.

Figure 2:
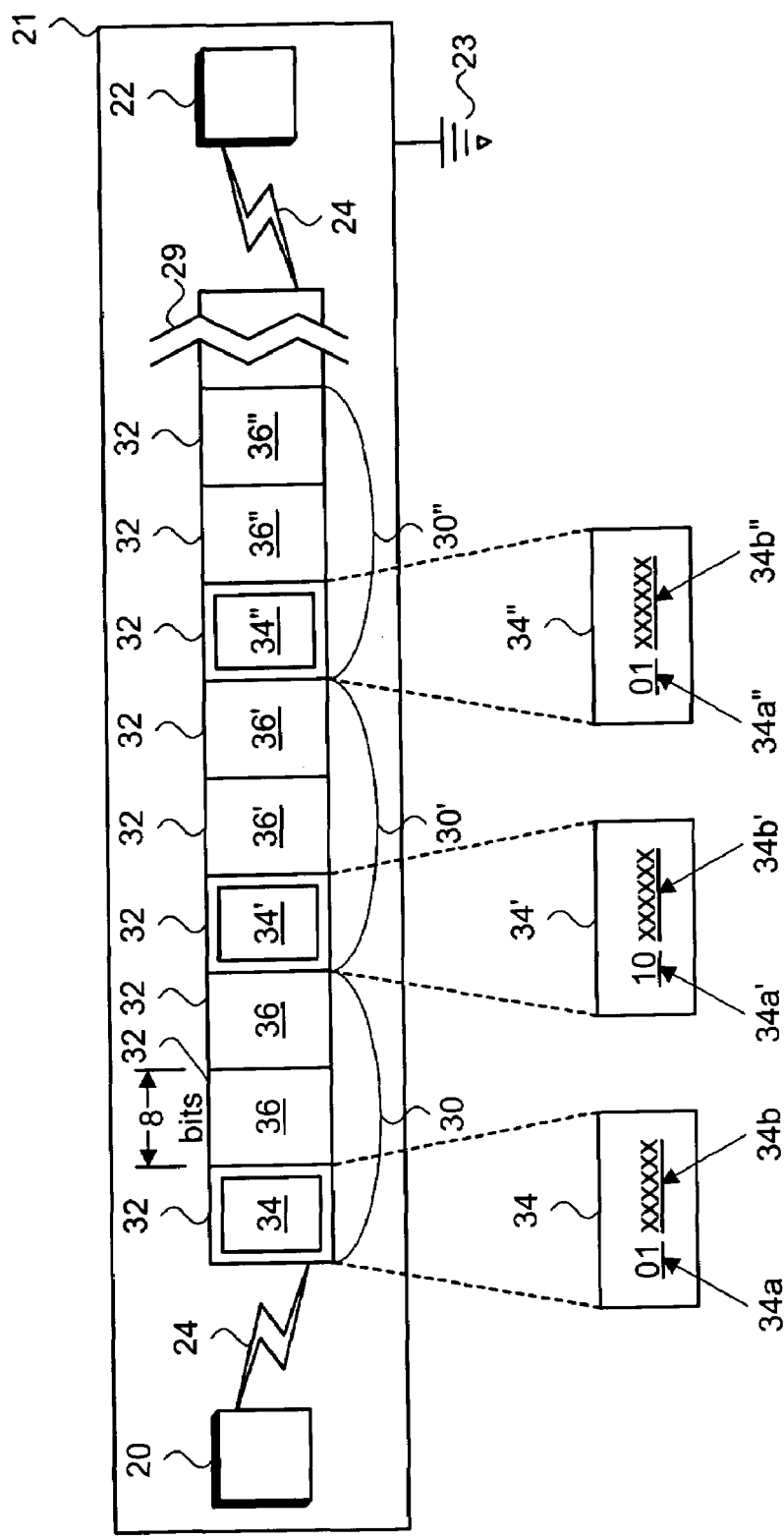
FIG. 2 is a schematic block diagram of one embodiment of the FPB of the present invention.

Thus, referring to FIG. 2, two devices (entities), a transmitting primary device 20 (which may also receive) and a receiving secondary device 22 (which may also transmit), desire to communicate over a serial bus line 24, utilizing data formatted and sent by the devices in a series of frames, or a frame format, such as frames 30, 30' and 30", which periodically repeat, and may be of the same size. The framed packet 30 comprises a block or plurality of bits of data or control bits (fields) 32 (also termed a "cycle"), which can be any predetermined number of bits but preferably an octet of data (8 bits). The cycles 32 may be framing cycles 34, which contain control data useful for the framed packet communication, or the cycles 32 may be data cycles 36, which contain the information of interest between the communicating entities 20, 22.

Devices (or entities) 20 and 22 comprise any circuits that communicate to and from one another serially, including but not limited to multiplexers/demultiplexers (both combinational and sequential), encoders, analog-to-digital converters, serdes (serializer/deserializer) circuits, switches (including but not limited to Batcher, banyan and knockout switches), routers (on a card), modems, computer controlled hardware, software controlled circuits, firmware, ASICs, programmable circuits, computers, transistor based circuits, data flow machines, multicomputers, or any hardware or software used in any layer of the OSI model for networking where, due to proximity, the requirement for DC balance may be safely relaxed. The devices 20 and 22 may include pure photonic and optical switches as well, where there is by definition no requirement for DC balance.

Devices 20 and 22 are preferably in synchronous serial communication, and, because of the relaxation of the DC balance, are generally contained within and grounded to a single common device or housing 21 (e.g., such as having both devices inside the same semiconductor chip, or inside a common printed circuit card in a commonly grounded chassis), having a ground 23, so that ground issues, such as might occur if the two devices 20 and 22 had different grounds, can be safely ignored.

Using the data format of the present invention it is estimated that the bus data utilization rises from less than 80% to approximately 95%, and conversely the bus overhead falls from over 20% to about 5%, contingent on the quality of the clock oscillator and clock synchronization circuit used in the implementation. The basic construction of the present invention assumes that for electronic devices the bus is contained within a single device, such as common device 21, having a ground 23 so that ground issues can be ignored. This is consistent with a bus implemented within a single printed circuit board or chip, or within one chassis between printed circuit boards. This assumption allows one to eliminate the need for DC balance in the data transmitted across the bus. Hence the bits in the framed packet of the present invention, and the packet bus structure, are characterized by the absence of DC balance if one were to analyze the 1's and 0's (HIGH and LOW voltages) of the digital bits being transmitted. The analysis of whether or not DC balance is present could be performed with an oscilloscope, or by otherwise checking average bit voltage values. The relaxation of the DC balance requirement in the present invention stands in marked contrast to prior implementations of serial bus protocols, such as the 8B/10B encoder implementation of FIG. 1, which guarantee DC balance. The devices 20, 22 lack DC balance in the digital bits transmitted by frames to and from the devices. While it may be possible for a particular frame to perchance have DC balance, on average, since the devices 20, 22 are not designed to provide DC balance, the frames transmitted between devices 20, 22 will lack DC balance for the average bit voltage levels in successive frames.

The remaining requirements, once the DC balance requirement is eliminated, include minimum bit transition frequency for clock recovery, delimiting of the packets, and error correction/detection. The present invention further frames the bus within the backplane of a serial circuit, and includes packet delimiters and error detection in a synchronous chip-to-chip packet bus.

As shown conceptually in FIG. 2, the framed bus provides the above requirements by dividing bus utilization into frames. A frame, such as frame 30 (or more accurately a frame period, which repeats itself every "X" cycles) consists of "X" frame cycles 32 (or bus cycles). The frames repeat themselves, as shown by frames 30, 30', 30" (with the broken lines 29 indicating an number of such repeating frames). The FIG. 2 the frames are shown as having preferably a predetermined fixed number of cycles 32. "X", the number of cycles 32 per frame, is a number selected based upon the minimum bit transition density of the particular serdes or devices 20, 22, that are communicating which will give adequate clock recovery, error detection and packet framing. For most applications an adequate number of cycles "X" equals twenty (20) cycles, and is the number of cycles for the preferred embodiments disclosed herein.

A cycle 32 is defined as a predetermined plurality of bits or block, such as data cycle 36, or control bits (fields), such as framing cycle 34, that travel on the bus 24. In the preferred embodiment such a block (cycle) is one octet (8 bits or 1 byte), though other measures may be used. One bus cycle (e.g., the frame cycle 34 of frame 30, frame cycle 34' of frame 30', or frame 34" of frame 30") is used every "X" bus cycles (frame period) to carry framing information (control information), and the framing information may be termed the frame cycle or framing cycle. The remaining cycles (e.g., data cycles 36 of frame 30, data cycles 36' of frame 30', data cycles 36" of frame 30"), are used for the actual data transmission of data (data information bits) of interest to devices 20, 22. The framing cycle always appears in the same relative position within the frame (e.g., always comes first, as shown in FIG. 2, or always last). Though the framing period in the preferred embodiment of the present invention has a predetermined fixed number of cycles of fixed size (in one preferred embodiment nineteen data cycles and one framing cycle for a total of twenty cycles, with each cycle one octet of bits in size), in general the frame periods do not have to have an equal number of cycles of equal size.

Thus, as shown in FIG. 2, framing cycle 34 is used to carry the information required to guarantee bit transitions and framing with the frame 30, framing cycle 34' carries control information for frame 30', and framing cycle 34" carries information for frame 30". In a preferred embodiment only the first two bits out of eight are used to guarantee bit transitions, that is, to show bits are not stuck on consecutive frames, and to confirm that the framing is still aligned (which can also be accomplished by checking the CRC). Specifically, two bits, referenced in FIG. 2 as bits 34a for frame cycle 34, bits 34a' for frame cycle 34', and bits 34a" for frame cycle 34", are assigned to carry the values either "01" or "10" (digital bits) at the start of the frame (or more generally at the delimiting endpoints of the frame, either the start or the end). The values alternate between the bitwise values 01 and 10, as shown by comparing bits 34a, 34a' and 34a". Thus the values 01 and 10 (bit values) alternative on consecutive framing cycles 34 and 34' and can be thought to delimit the start and end of the frame. This provides some bit transitions every "X" cycles (where "X" equals twenty cycles, one frame cycle and nineteen data cycles), and prevents 'stuck' bits from being detected as framing cycles, since after counting "X" cycles the devices 20, 22 would expect either a transition from the state '10' to '01' or from the state '01' to '10' in these bits, as well as confirming that the framing is still aligned (which may also be done by checking the CRC values of the frame). In general, entities 20, 22 will be able to recognize the frame cycle by counting the number of frame cycles, such as the "X" frame cycles 32 within the frame 30 (where "X" equals twenty cycles preferably). The frame period is identified by the devices 20, 22 by a training cycle when the bus starts to be used for communication; thereafter, the devices 20, 22 simply counts "X" bus/frame cycles between frame periods. The bit transitions in the frame, as well as the CRC values of the frame, simply server to confirm that the framing alignment is still as expected.

Some or all of the remaining six (6) bits in each framing cycle (the leftover bits), referenced by bits 34b in framing cycle 34 of frame 30, 34b' in framing cycle 34' of frame 30', and 34b" in framing cycle 34" of frame 30" (and so on), can be used to indicate where the start of a packet of data is within the next (or previous) "X" cycles on the bus, such as with an offset or pointer to the data, or as control bits for the framing cycle, as described further below. Leftover bits from successive frames may be combined by the devices 20, 22. The number of bits required to reference data cycles is contingent on the size of the frame (which depends on the number "X" of cycles), and the minimum packet size carried on the bus. Thus note to address up to 512 octets one would need 9 bits, as $2^9=512$, or in general to address up to Y octets with N such control bits, $2^N = Y$.

Leftover bits within the frame cycle on the bus may carry error detection information, or be utilized as a control "back channel". Leftover bits, such as bits 34b, 34b', 34b" within the framing cycles 34, 34', 34", respectively, can be used to reference, indicate or point to the start of packets of data within the data cycles, such as data cycles 36, 36' and 36". This can be done by the technique of segmenting some or all of these bits into one or more bit fields which contain a value treated as an octet (or bit) offset into the data portion of the frame where a packet begins. Each of these bit fields could also specify the start of a unique packet (or indicate no additional packets) within the frame. In this way there would be no need to insert a flag delimiter sequence, such as a unique bit pattern having a particular value to indicate the start of a packet, as found in some prior art implementations of packet communication networks.

In addition, the extra framing cycle bits (the leftover bits), such as bits as bits 34b, 34b', 34b" within the framing cycles 34, 34', 34", may be used for error checks on the data in the framing cycle (e.g., via CRC), or to carry other control information between the two communicating devices 20 and 22 in FIG. 2. An example of control information might be a communication from device 20 to device 22 specifying that a simultaneous reset of a data scrambler circuit prior to the next frame is required. One or more leftover bits within the framing cycle may be utilized for this type of control communication.

The Framed Packet Bus was described above as a framing mechanism for a single serial bus, but the concept extends to a high speed parallel bus comprised of multiple serial links formed in parallel. This is shown conceptually in FIG.

3, as sixteen transmitting and/or receiving devices 300 to 315 communicate with their counterparts over sixteen serial links L0 to L15. In this case, each individual serial link L has a framing cycle every "X" bus cycles. The framing cycle occurs at the same alignment relative to each stream of data. Each serial link framing cycle must send the alternating "01" and "10" pattern, unless the base parallel serial link technology utilizes a clock recovered from just a single link. In this latter case, only the serial link on which the clock is recovered need send the alternating bit pattern during the framing cycle, and the other links may use their bits for other purposes. The remaining bits in the framing cycle (e.g., leftover bits such as bits 34b in framing cycle 34 of FIG. 2) are utilized to indicate the start of packets of data on the 16 lines, between the framing cycles. The bus cycle size, the number of cycles between frame cycles, and the allocation of bits to delimit packet starts between frame cycles will vary per implementation. This is dependent on clock quality, clock synchronization accuracy, and packet minimum and maximum sizes.

A specific prospective example of the present invention for a parallel embodiment of the kind disclosed in FIG. 3, comprised of serial links, is as follows, as illustrated further in FIGS. 4 and 5. This prospective example is by way of illustration and does not limit the invention to this particular configuration. Assume the clock and synchronization quality require a bit transition no less than every 160 bits (20 frame cycles, consisting of 19 data cycles, comprised of Data Cycle 0 to Data Cycle 18, and one framing cycle field, F0, times eight bits per cycle field). Further assume that the data packets are a minimum of sixty-four (64) octets in size (512 bits), and that the data path must be comprised of sixteen "parallel configuration" serial lines, that is, sixteen (16) serial lines in parallel. Given these specifications, one can construct a Framed Packet Bus using the teachings of the present invention wherein each serial line on the bus carries nineteen octets of packet data and one octet of frame data each "frame period" as shown in the table in FIG. 5 (e.g., a row 500 in FIG. 5, which represents the data flow over time for each serial link). The frame cycle for the parallel configuration of the serial FPB is comprised of a total of 128 bits [16 serial lines*8 bits per line] of data sent across the 16 serial lines of the bus during the parallel bus frame cycle (e.g., a column 510 in FIG. 5). A total of 32 bits of bit transitions (2 bits for each of the 16 serial lines, as shown by columns b0 and b1 in FIG. 4) are sent during this framing cycle, leaving 96 bits (128–32) for other purposes. A total of 304 octets (304*8=2432 bits=128 bits/cycle*19 data cycles) are transmitted during the 19 data cycles on the bus. This allows a maximum of parts of six (6) different data packets (the data packets are distributed over the 16 serial lines, so they may be referenced as distributed data packets) to appear during the frame period, and only five (5) different data packets may "start" within the frame period. Indexing the start of these 5 packets requires nine (9) bits each to "point" to one of the 304 octets as the start of a packet (note 9 bits may be used as $2^9$ =512, allowing one to address the 304 octets uniquely). A 9 bit index field can also carry a unique value such as "101010101" to indicate that it does not point to a packet. For example, a 9 bit index field containing the value 0000000011 would indicate that a packet begins at the fourth octet of data within the frame, shown as D4 in FIG. 5. This utilizes 45 of the 96 bits that were left, leaving 51 leftover bits to allocate during the framing cycle for other purposes. These bits may be used for varying purposes per implementation, but a valid use would be a 32 bit Cyclic Redundancy Check (CRC) on the contents of the 19 data cycles, and a control back channel for the remaining 19 bits. Conceptually, this is shown by reference to the table of FIG. 4.

Figure 3:
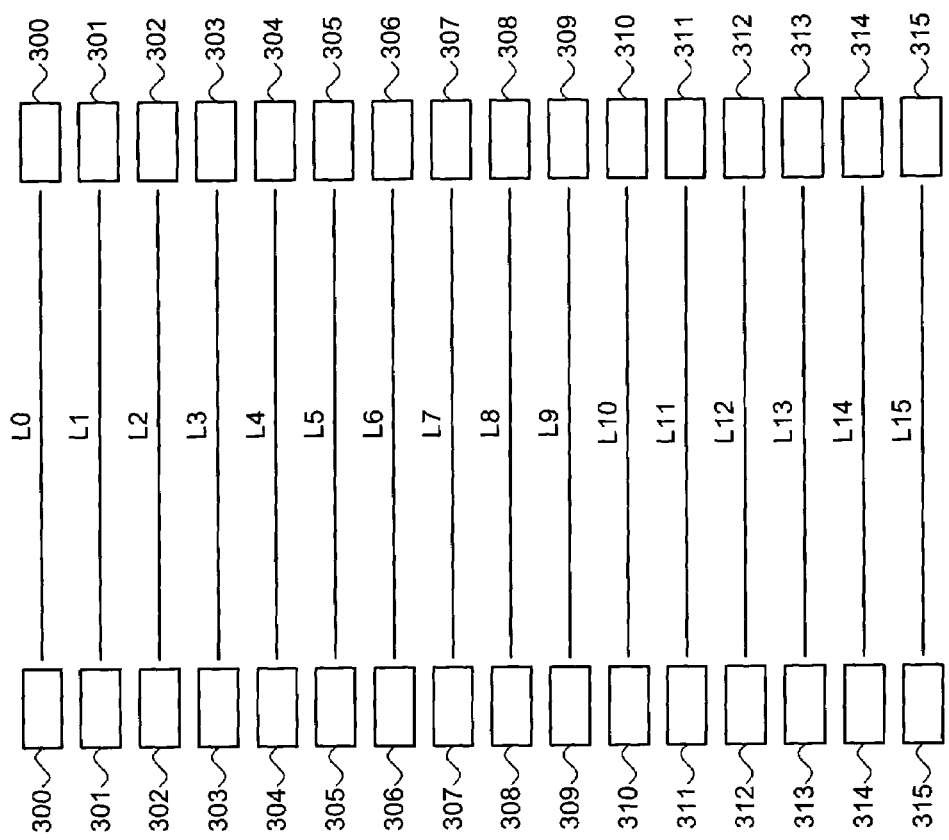
FIG. 3 is a block diagram of a parallel embodiment of the FPB of the present invention.
Figure 4:
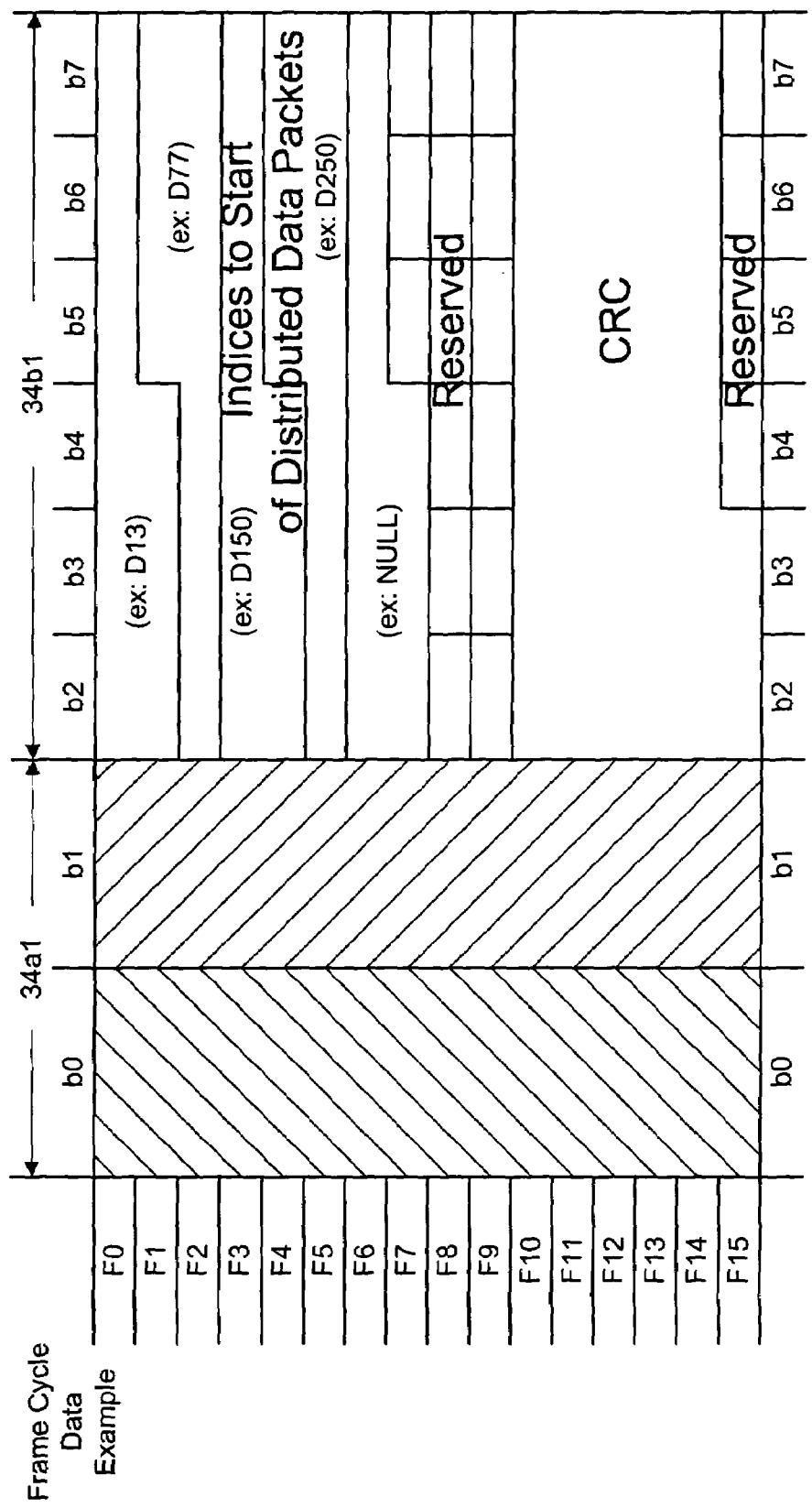
FIG. 4 is a table of the FPB frame and bit field values for a prospective example of the parallel implementation of the present invention.

Thus, FIG. 4 shows a table for the bit values, such as bit values 34a, 34b of a framing cycle 34 in FIG. 2, which correspond to columns 34a1 and 34b1, respectively in FIG. 4, for the parallel configuration of FIG. 3. The columns in the table of FIG. 4 represent the bit values in the framing cycle octet 34, and are designated b0 to b7. The first two bits, marked as column 34a1 (e.g., such as bits 34a in FIG. 2) represent the bit transitions that start the frame, as discussed above, and are either bitwise '10' or '01''. The remaining six bits, marked as column 34b1, b2 to b7 (e.g., such as leftover bits 34b in FIG. 2) may be used for a variety of purposes, as described herein, such as to control back channel, error detection, and pointing to the start of particular distributed data packets (a particular packet of data distributed across the parallel configured serial links).

By way of a prospective example and not by limitation, suppose there are five packets of data distributed over the 16 lines, and if the start of the first distributed data packet was found on the fourteenth serial link (L13 in FIG. 3, and Serial Link 13 in FIG. 5), and at the first data cycle (Data Cycle 0, at D13 in FIG. 5), after frame cycle F13, then this information could be packed into the leftover bits (e.g. such as bits 34b in FIG. 2) in one of the other framing cycles. If there are 304 octets, with nine bits addressing these 304 octets, then the nine bits needed to reference the start of the first of the five distributed data packets, could consist of six leftover bits b2 through b7 of frame F0, and three leftover bits b2 through b4 of frame F1 (6+3=9 bits). This is indicated graphically in FIG. 4 by reference to the nine cells labeled "ex: D13". These cells, along with the cells marked "ex: D150" and "ex: D250", represent values that point to or represent indices to the start of distributed data packets, and marked as such in FIG. 4.

Figure 5:
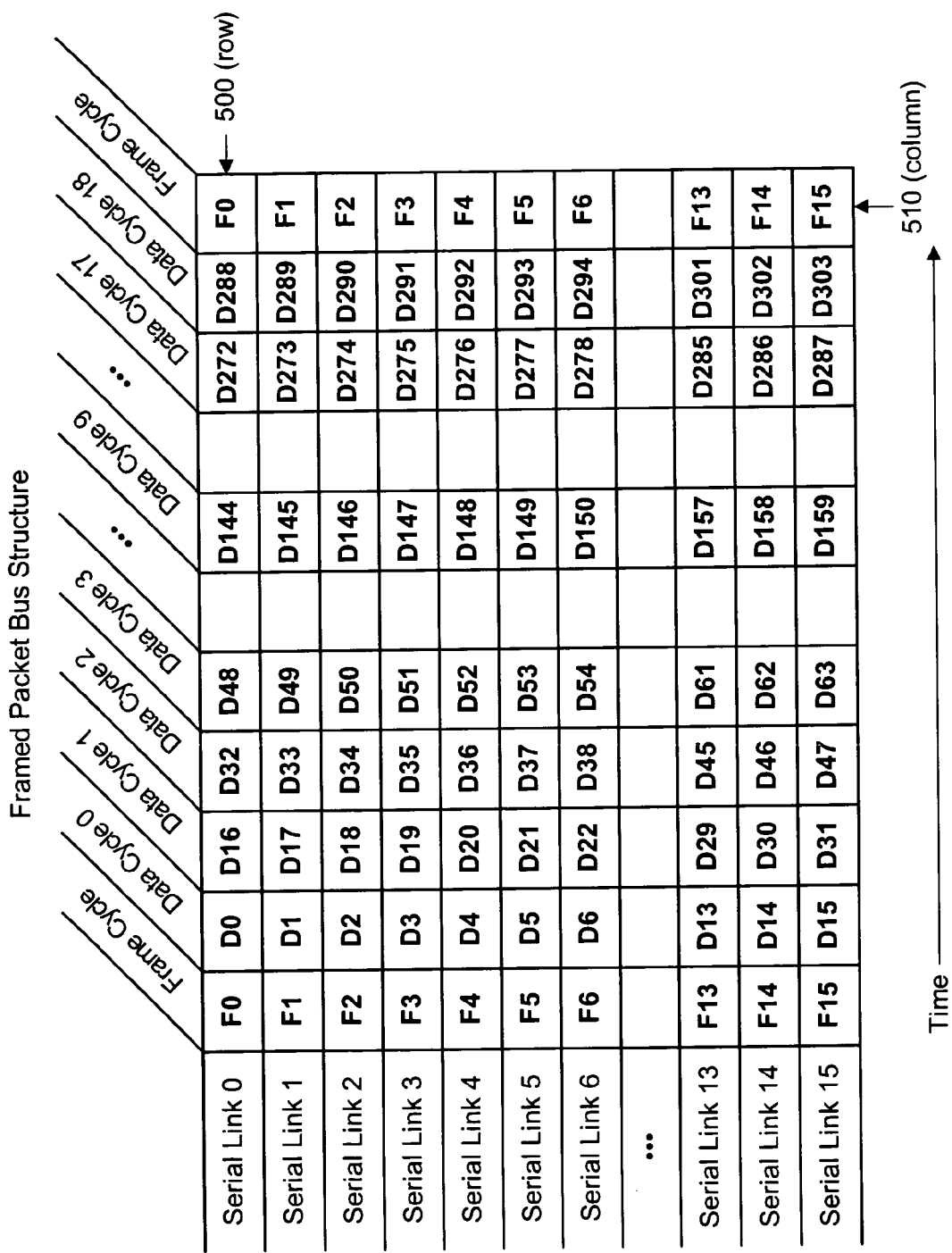
FIG. 5 is a table of the serial link and frame cycles over time for the prospective example of the parallel implementation of the present invention.

Likewise if the start of another distributed data packet was found on the data cycle D150, which in the example of FIG. 5 would be found in the seventh serial link (i.e. link L6 in FIG. 3, and the row marked Serial Link 6 in FIG. 5), and at the ninth data cycle (Data Cycle 9, at box D150 in FIG. 5), then this information could be packed into leftover bits in one of the other framing cycles. This is shown graphically in FIG. 4 by reference to the nine cells labeled "D150", which comprise the six leftover bits b2 to b7 of frame F3, and the three leftover bits b2 to b4 of frame F4 (6+3=9 bits).

Furthermore, the other leftover bits could reference the start of the other distributed data packets, such as indicated graphically in FIG. 4 as the nine bit cells marked "ex: D77", for the start of a distributed data packet at data cycle D77, the nine cells marked "ex: D250" for the start of a distributed data packet at data cycle D250, and so on. These same leftover bits may also reference a NULL value, which is used when fewer than the maximum number of packets start per frame are contained within the frame (shown as the bit cells marked "ex: NULL" in frames F6 and F7 of FIG. 4). In the example in FIG. 4, it is seen that these leftover bits point to the start of packets at D13, D77, D150, D250 and NULL. For in the example of FIG. 4, this means that there are four packets beginning within this frame, but not the maximum of five packets, thus the last field for pointing at a packet start is filled with the value 'NULL', meaning no additional packet start is indexed by these bits.

The leftover bits may also be reserved for other control functions (shown as cells marked "RESERVED" in FIG. 4), to carry backchannel, or to be used for error detection, such as checksum polynomial code (shown as cells marked "CRC" in FIG. 4).

The method of practicing the present invention is the same series of steps as disclosed in the embodiments of FIGS. 2–5 supra. There is formed a frame cycle and a data cycle of digital bits on a framed packet protocol serial bus to transfer data between two devices (entities) that desire to communicate on a Framed Packet Bus (FPB). The method of transmitting consists of forming a packet of data, parsing the packet into a series of frames, having a plurality of frame cycle of bits that represent control bits for delimiting each of the frames and a plurality of data cycle bits for data to be transmitted between the entities. The method of the FPB implementation of the present invention may be practiced over a number of serial lines formed in parallel. The data packets are thus distributed over a number of serial lines (in parallel), as discussed above. In the frame cycle of bits, only two bits out of the octet are used and the leftover bits may be employed for a plurality of other purposes, such as for error detection, clock recovery, and other control information, including pointing to the start of a particular data cycle of bits (a data packet). The entities (which may be software or hardware controlled, or any combination of the two) can identify the start of a parallel distributed data packet by referring to and using the leftover bits in the frame cycle, which may be defined as an offset to a particular starting value. There is no DC balance performed on the bits transmitted between the entities, thus the packet of bits of consecutive successive frames of the present invention are characterized, unlike prior protocols, as having an absence of DC balance on average.

The advantage of the Framed Packet Bus of the present invention over the conventional techniques of serial bus protocol design discussed herein is a higher utilization of the bus for data transmission itself. With the prior art 8B/10B encoder configuration discussed one would obtain a maximum of 80% utilization for actual data transmission. In the example given above, the Framed Packet Bus achieves, over the twenty cycles, a 19/20*100%, or 95% bus utilization for informational data. Additionally, the Framed Packet Bus provides error checking, packet delineation and back channel communication paths while achieving a high data utilization percentage. The 95% number may vary depending on implementation used, but these numbers are believed achievable. The advantage of the higher percentage of bus utilization for data is the clock rates may be lowered while sending the same amount of data in order to achieve lower power or to reduce design complexity. Conversely, more data may be sent at the same clock rate as would be used for other designs not utilizing the Framed Packet Bus. Further, any liabilities associated with SONET systems are reduced. The Framed Packet Bus is extremely simple to implement, requiring only a minimal training sequence to detect the framing cycle when the system is started. Thereafter, the bus implementation requires a cycle counter and two states, a data cycle and frame cycle. The Framed Packet Bus also provides simple data framing, and substantial error checking mechanisms to assure correct bus operation.

Though the preferred embodiments are disclosed in the present invention, alternative mechanisms may be employed without departing from the scope of the invention. For example, the number of serial lines may vary, the number of cycles in a frame period may vary, and the exact allocation of bits within a frame cycle (other than forcing bit transition bits to be contained in the framing cycle) may vary. It is to be understood that while the invention has been described above in conjunction with preferred specific embodiments, the description and examples are intended to illustrate and not limit the scope of the invention, which is defined by the scope of the appended claims.

We claim:

1. An improved protocol for devices comprising:
a serial bus for communication between a pair of devices;
communication on said serial bus between said devices utilizing a protocol comprising a plurality of digital bits in a predetermined format, said predetermined format comprising a frame;
said frame comprising a plurality of digital bits forming a framing cycle and a plurality of bits forming a data cycle, wherein the framing cycle provides a minimum bit transition frequency allowing clock recovery by the receiving device;
said devices formatting said digital bits in said predetermined frame format; said devices having no requirement for DC balance when formatting said digital bits, wherein said bits of said frame have an absence of DC balance in their average voltage levels.

2. The invention of claim 1, wherein:
said pair of devices comprise a transmitting circuit and a receiving circuit communicating serially with one another on said bus with said plurality of bits, said bits being digital bits having voltage level values of HIGH and LOW; and
said transmitting circuit and said receiving circuit being in substantially close proximity to one another, wherein said frame of bits is characterized by the absence of DC balance in the average voltage levels of said bits.

3. The invention of claim 2, wherein:
said transmitting and said receiving circuits share the same ground, said circuits transmitting and receiving a plurality of said frames on said bus.

4. The invention of claim 3, wherein:
said framing cycle comprises a predetermined number of bits for control by said devices, with a first predetermined number of said predetermined framing cycle bits designated for carrying first control information, and a second, leftover predetermined number of said framing cycle bits designated for carrying second control information.

5. The invention of claim 4, wherein:
said leftover control bits are used by said circuits for error correction of said frames.

6. The invention of claim 5, wherein:
said leftover control bits used for error correction by said circuits are for polynomial code checksum error detection; and,
said transmitting and receiving circuits are in synchronous communication.

7. The invention of claim 4, further comprising:
a plurality of said transmitting and receiving circuits, a plurality of said serial buses, each of said plurality of circuits sharing a serial bus, with one transmitting circuit and one receiving circuit on each of said plurality of serial buses, to form a parallel configuration;
wherein said transmitting and receiving circuits are in synchronous communication, and
wherein said plurality of circuits send and receive a plurality of said frames along said serial buses arranged in parallel.

8. The invention of claim 7, wherein:
said second predetermined number of leftover control bits are used to reference one of said data cycles.

9. The invention of claim 8, wherein:
a plurality of said second predetermined number of leftover control bits from a consecutive plurality of frames are used to reference a plurality of data cycles transmitted between said plurality of transmitting and receiving circuits, with the maximum number Y of data cycles that can be referenced by a number N of said leftover bits determined by the formula $Y=2^N$.

10. The invention of claim 9, wherein:
said frame comprises one framing cycle for every nineteen data cycles, and said framing cycle comprises an octet.

11. The invention of claim 4, wherein:
said first Predetermined number of said framing cycle bits carrying first control information comprising a pair of bitwise values '10' that alternate on consecutive frames on said serial bus with the bitwise values '01'; and,
wherein said framing cycle comprises an octet of bits.

12. The invention of claim 4, wherein:
said first predetermined number of said framing cycle bits carrying first control information comprising a pair of bitwise values '10' that alternate on consecutive frames on said serial bus with the bitwise values '01'; and,
wherein said framing cycle comprises an octet of bits.

13. The invention of claim 3, wherein:
said first predetermined number of said framing cycle bits carry bits that alternate in value between HIGH and LOW between successive frames of said plurality of frames between transmitting and receiving circuits.

14. The invention of claim 13, wherein:
said leftover control bits are used to carry second control information used by said devices for control of the communication between said devices.

15. The invention of claim 14, wherein:
said leftover control bits are selected from the group consisting of bits for error correction, bits for CRC error correction, bits for the control of back channel, bits for pointing to reference one of said data cycles transmitted between said plurality of transmitting and receiving circuits, and bits that have a NULL value.

16. The invention of claim 14, wherein:
said leftover control bits are used by said devices for referencing a data cycle.

17. The invention of claim 14, wherein:
a plurality of leftover control bits of number N from a consecutive plurality of said frames are combined by said circuits to reference a plurality of data cycles, with the maximum number Y of data cycles that can be referenced by said leftover bits determined by the formula Y=2N.

18. The invention of claim 3, wherein:
said transmitting and receiving circuits are circuits selected from the group consisting of multiplexers, encoders, analog-to-digital converters, serdes, Batcher, banyan and knockout switches, routers (on a card), modems, and data flow machines with the bitwise values '01'; and,
wherein said framing cycle comprises an octet of bits.

19. The invention of claim 2, further comprising:
a plurality of said transmitting and receiving circuits, a plurality of said serial buses, each of said plurality of circuits sharing a serial bus, with one transmitting circuit and one receiving circuit on each of said plurality of serial buses, to form a parallel configuration, wherein said transmitting and receiving circuits are in synchronous communication.

20. The invention of claim 19, wherein:
said transmitting and receiving circuits are circuits selected from the group consisting of multiplexers, encoders, analog-to-digital converters, serdes, Batcher, banyan and knockout switches, routers (on a card), modems, and data flow machines.

21. The invention of claim 19, wherein:
said transmitting and said receiving circuits share the same ground, said circuits transmitting and receiving a plurality of said frames on said bus; and,
said framing cycle comprises a predetermined number of bits for control, with a first predetermined number of said predetermined framing cycle bits designated for carrying first control information for said frame, and a second, leftover predetermined number of said framing cycle bits designated for carrying second control information for said frame.

22. The invention of claim 21, wherein:
said leftover framing cycle bits carry second control information selected from the group consisting of bits for error correction, bits for CRC error correction, bits for the control of back channel, bits for pointing to reference one of said data cycles transmitted between said plurality of transmitting and receiving circuits, and bits that have a NULL value.

23. The invention of claim 22, wherein:
said frame comprises one framing cycle for every nineteen data cycles, and said framing cycle comprises an octet of bits.

24. An improved protocol for digital transmission of data in frames comprising:
a plurality of digital bits in a predetermined format defining a frame, said predetermined format comprising a plurality of digital bits comprising bits forming a frame cycle and bits forming a data cycle;
said frame cycle carrying information relating to the protocol for said frame, and said data cycle carrying informational data to be transmitted by said protocol;
a plurality of said frames, wherein said protocol is characterized by the voltage levels of bits on successive frame cycles and said successive data cycles on consecutive frames having no DC balance, and wherein said successive framing cycles provide a minimum bit transition frequency allowing clock recovery by a device receiving said frames.

25. The invention of claim 24, wherein:
said frame cycle bits comprise bits delimiting said frame and leftover bits, said leftover bits used for the carrying control information for said frame.

26. The invention of claim 25, wherein said leftover bits are used for error correction.

27. The invention of claim 25, wherein said leftover bits are used for pointing to data cycles.

28. The invention of claim 25, wherein said bits delimiting said frame alternate between bitwise values of '10' and '01' on successive frames.

29. The invention of claim 25, wherein said leftover bits from consecutive frames are combined to reference a plurality of data cycles, with the maximum number Y of data cycles that can be referenced by a number N of said leftover bits determined by the formula $Y=2^N$.

30. The invention of claim 29, wherein said protocol is used for synchronous communication.

31. The invention of claim 30, further comprising:

a plurality of transmitting and receiving circuits, a plurality of serial buses, each of said plurality of circuits sharing between a pair of transmitting and receiving circuits one of said plurality of serial buses, to form a parallel configuration;

said transmitting and receiving circuits in synchronous communication;

wherein said protocol is used between a plurality of circuits in serial communication with one another, said plurality of circuits arranged in parallel.

32. A method of transmitting data according to a protocol comprising the steps of:

forming a packet of data comprising digital bits having a HIGH voltage and a LOW voltage;

parsing said packet of data into a plurality of frames;

parsing each of said frames into a plurality of bits that form a data cycle and a plurality of bits that form a frame cycle;

transmitting said plurality of frames;

wherein said plurality of frames, said data cycles and said frame cycles are comprised of bits characterized by having an absence of DC balance in their HIGH and LOW voltages, and wherein the framing cycles provide a minimum bit transition frequency allowing clock recovery by a receiving device.

33. The method of transmitting data according to claim 32, further comprising the step of:

connecting at least two devices with a bus that transmits data serially between said devices, said devices utilizing said protocol on said bus to communicate with one another.

34. The invention of claim 33, further comprising the steps of:

fabricating said devices from electronic circuits, said electronic circuits in substantial close proximity to one another and sharing a common ground.

35. The method of transmitting data according to claim 33, further comprising the step of:

forming a parallel configuration from a plurality of said serially communicating devices, with each said serial bus providing communication between said two electrical devices, and said plurality of serially communicating devices arranged in parallel to one another.

36. The method of transmitting data according to claim 32, further comprising the steps of:

parsing said frame cycle into a predetermined number of bits for control, with a first predetermined number of said predetermined framing cycle bits designated for carrying first control information, and a second, leftover predetermined number of said framing cycle bits designated for carrying second control information.

37. The invention of claim 36, further comprising the steps of:

utilizing said first predetermined number of said frame cycle bits to carry bits that alternate in value between HIGH and LOW between successive frames of said plurality of frames between transmitting and receiving circuits;

utilizing said leftover control bits are for referencing a data cycle within one of said plurality of frames in said parallel configuration, with the maximum number Y of data cycles that can be referenced by a number N of said leftover bits determined by the formula $Y=2^N$.

38. An improved protocol for devices comprising:

a plurality of serial buses;

a plurality of said transmitting and receiving circuits, with one transmitting circuit and one receiving circuit sharing each of said plurality of serial buses, to form a parallel configuration, wherein each pair of said circuits share a same ground and are in substantially close proximity to one another;

synchronous, serial communication on said serial bus between said circuits utilizing a protocol comprising a plurality of digital bits in a predetermined format comprising a frame, said bits being digital bits having voltage level values of HIGH and LOW;

wherein said plurality of circuits send and receive a plurality of said frames along said serial buses arranged in parallel, wherein each of said frames comprise a plurality of digital bits forming a framing cycle and a plurality of bits forming a data cycle, said framing cycle comprising a predetermined number of bits for control by said devices, with a first predetermined number of said predetermined framing cycle bits designated for carrying first control information, and a second, leftover predetermined number of said framing cycle bits designated for carrying second control information;

said devices formatting said digital bits in said predetermined frame format; said devices having no requirement for DC balance when formatting said digital bits, wherein said bits of said frame have an absence of DC balance in the average voltage levels of said bits.

39. An improved protocol for devices comprising:

a plurality of serial buses;

a plurality of said transmitting and receiving circuits selected from the group consisting of multiplexers, encoders, analog-to-digital converters, serdes, Batcher, banyan and knockout switches, routers (on a card), modems, and data flow machines, with one transmitting circuit and one receiving circuit sharing each of said plurality of serial buses, to form a parallel configuration, wherein each pair of said circuits share a same ground and are in substantially close proximity to one another;

synchronous, serial communication on said serial bus between said circuits utilizing a protocol comprising a plurality of digital bits in a predetermined format comprising a frame, said bits being digital bits having voltage level values of HIGH and LOW;

wherein said plurality of circuits send and receive a plurality of said frames along said serial buses arranged in parallel, wherein each of said frames comprise a plurality of digital bits forming a framing cycle and a plurality of bits forming a data cycle, wherein said frame comprises one framing cycle for every nineteen data cycles, and said framing cycle comprises an octet of bits;

said framing cycle comprising a predetermined number of bits for control by said devices, with a first predetermined number of said predetermined framing cycle bits designated for carrying first control information, and a second, leftover predetermined number of said framing cycle bits designated for carrying second control information, said leftover framing cycle bits carry second control information selected from the group consisting of bits for error correction, bits for CRC error correction, bits for the control of back channel, bits for pointing to reference one of said data cycles transmitted between said plurality of transmitting and receiving circuits, and bits that have a NULL value;

said devices formatting said digital bits in said predetermined frame format; said devices having no requirement for DC balance when formatting said digital bits, wherein said bits of said frame have an absence of DC balance in the average voltage levels of said bits.

40. An improved protocol for digital transmission of data in frames comprising:
a plurality of digital bits in a predetermined format defining a frame, said predetermined format comprising a plurality of digital bits comprising bits forming a frame cycle and bits forming a data cycle, wherein said frame cycle bits comprise bits delimiting said frame and leftover bits, said leftover bits used for error correction and for pointing to data cycle;
said frame cycle carrying information relating to the protocol for said frame, and said data cycle carrying informational data to be transmitted by said protocol;
a plurality of said frames, wherein said protocol is characterized by the voltage levels of bits on successive frame cycles and said successive data cycles on consecutive frames having no DC balance.

41. An improved protocol for digital transmission of data in frames comprising:
a plurality of digital bits in a predetermined format defining a frame, said predetermined format comprising a plurality of digital bits comprising bits forming a frame cycle and bits forming a data cycle, wherein said frame cycle bits comprise bits delimiting said frame and leftover bits, said leftover bits used for carrying control information for said frame, wherein said bits delimiting said frame alternate between bitwise values of '10' and '01' on successive frames;
said frame cycle carrying information relating to the protocol for said frame, and said data cycle carrying informational data to be transmitted by said protocol;
a plurality of said frames, wherein said protocol is characterized by the voltage levels of bits on successive frame cycles and said successive data cycles on consecutive frames having no DC balance.

42. An improved protocol for digital transmission of data in frames comprising:
a plurality of digital bits in a predetermined format defining a frame, said predetermined format comprising a plurality of digital bits comprising bits forming a frame cycle and bits forming a data cycle, wherein said frame cycle bits comprise bits delimiting said frame and leftover bits, said leftover bits used for carrying control information for said frame, wherein said leftover bits from consecutive frames are combined to reference a plurality of data cycles, with a maximum number Y of data cycles that can be referenced by a number N of said leftover bits determined by the formula $Y=2^N$;
said frame cycle carrying information relating to the protocol for said frame, and said data cycle carrying informational data to be transmitted by said protocol;
a plurality of said frames, wherein said protocol is characterized by the voltage levels of bits on successive frame cycles and said successive data cycles on consecutive frames having no DC balance.

43. A method of transmitting data according to a protocol comprising the steps of:
forming a parallel configuration from a plurality of serial busses and a plurality of said serially communicating devices, with each said serial bus providing communication between two of said serially communicating devices, and said plurality of serially communicating devices arranged in parallel to one another, said devices utilizing said protocol on said bus to communicate with one another by;
forming a packet of data comprising digital bits having a HIGH voltage and a LOW voltage;
parsing said packet of data into a plurality of frames;
parsing each of said frames into a plurality of bits that form a data cycle and a plurality of bits that form a frame cycle;
transmitting said plurality of frames;
wherein said plurality of frames, said data cycles and said frame cycles are comprised of bits characterized by having an absence of DC balance in their HIGH and LOW voltages.

44. A system for providing improved protocol for devices comprising:
a backplane;
a plurality of serial buses framed within the backplane; and
a plurality of transmitting and receiving circuits coupled to said plurality of serial buses such that one transmitting circuit and one receiving circuit share a respective one of said plurality of serial buses, thereby forming a parallel configuration, wherein each pair of said circuits share a same ground;
said circuits synchronously communicating a plurality of digital bits across said serial buses utilizing a protocol that formats said digital bits into frames, wherein each of said frames includes one framing cycle and a plurality of data cycles, wherein the framing cycle provides a minimum bit transition frequency allowing the receiving circuits to perform clock recovery;
said circuits having no requirement for DC balance when formatting said digital bits, such that voltage levels of said bits of said frames have an absence of DC balance.

45. An improved protocol for devices comprising:
a plurality of serial buses for communication between a pair of devices, wherein said pair of devices comprise a plurality of transmitting and receiving circuits communicating serially with one another on said serial buses with said plurality of bits, said bits being digital bits having voltage level values of HIGH and LOW, wherein each of said plurality of circuits sharing a serial bus, with one transmitting circuit and one receiving circuit on each of said plurality of serial buses, to form a parallel configuration, wherein said transmitting and receiving circuits are in synchronous communication, said transmitting circuit and said receiving circuit being in substantially close proximity to one another;
communication on said serial bus between said devices utilizing a protocol comprising a plurality of digital bits in a predetermined format, said predetermined format comprising a frame;
said frame comprising a plurality of digital bits forming a framing cycle and a plurality of bits forming a data cycle;
said devices formatting said digital bits in said predetermined frame format; said devices having no requirement for DC balance when formatting said digital bits, wherein said bits of said frame have an absence of DC balance in their average voltage levels.

46. An improved protocol for digital transmission of data in frames comprising:
- a plurality of digital bits in a predetermined format defining a frame, said predetermined format comprising a plurality of digital bits comprising bits forming a frame cycle and bits forming a data cycle, wherein said frame cycle bits comprise bits delimiting said frame and leftover bits, said leftover bits used for carrying control information for said frame and for pointing to data cycles; said frame cycle carrying information relating to the protocol for said frame, and said data cycle carrying informational data to be transmitted by said protocol; and
- a plurality of said frames, wherein said protocol is characterized by the voltage levels of bits on successive frame cycles and said successive data cycles on consecutive frames having no DC balance.

* * * * *